July 24, 1956  L. A. MORRIS  2,755,776
STORKE CONTROL FOR HYDRAULIC CYLINDER
Filed May 10, 1955
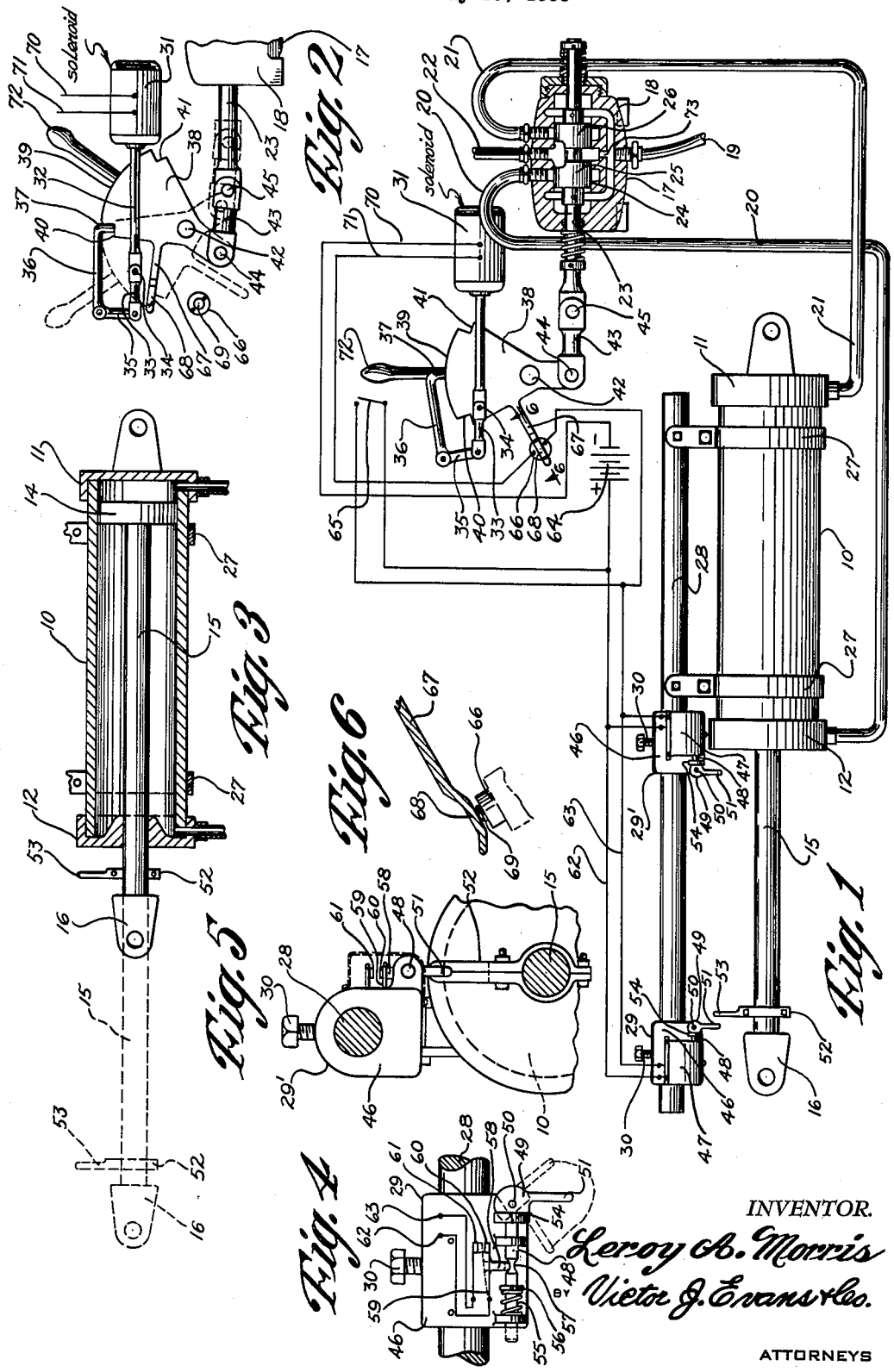
INVENTOR.
Leroy A. Morris
Victor J. Evans & Co.
ATTORNEYS United States Patent Office 2,755,776
Patented July 24, 1956

2,755,776
STROKE CONTROL FOR HYDRAULIC CYLINDER

Leroy A. Morris, Presho, S. Dak.

Application May 10, 1955, Serial No. 507,322

2 Claims. (Cl. 121—38)

This invention relates to hydraulic cylinders, and more particularly to a mechanism for controlling the stroke of hydraulic cylinders.

The object of the invention is to provide a mechanism which is adapted to be used for controlling the stroke of a hydraulic cylinder so as to permit adjustment of a machine being pulled by a tractor.

Another object of the invention is to provide a hydraulic cylinder control mechanism for use with a tractor and implement being pulled by the tractor, whereby the stroke of the hydraulic cylinder can be extended beyond the normal range thereof.

A further object of the invention is to provide a hydraulic cylinder stroke control mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the hydraulic cylinder, illustrating schematically the wiring diagram.

Figure 2 is a fragmentary elevational view illustrating the connections between the solenoid and four way valve.

Figure 3 is a longitudinal sectional view taken through the cylinder.

Figure 4 is an elevational view, with parts broken away and in section, illustrating one of the switches.

Figure 5 is a transverse sectional view illustrating one of the switches and the stop member for actuating the switch.

Figure 6 is a sectional view taken on the line 6—6 of Figure 2.

Referring in detail to the drawings, the numeral 10 designates a hydraulically actuated cylinder which has caps 11 and 12 on its ends, Figures 1 and 3. A plunger or piston 14 is reciprocably or slidably mounted in the cylinder 10, and a rod 15 has its inner end secured to the piston 14. A bracket 16 is mounted or arranged on the outer end of the rod 15, and the bracket 16 is adapted to be connected to a suitable tool or implement being towed or pulled behind a tractor.

Spaced from the cylinder 10 is a four way valve 17 which includes a housing 18, and a conduit 19 leads from the housing 18 to a reservoir. Conduits 20 and 21 also lead from the housing 18 to opposite ends of the cylinder 10, and a conduit 22 may lead from the housing 18 to a suitable hydraulic pump. A stem 24 is movably mounted in the housing 18, and a pair of valve members 25 and 26 are mounted on the stem 24, there being an arm 23 for moving the stem 24.

Arranged in engagement with the cylinder 10 is a pair of clamps 27 which are secured to a bar 28 of cylindrical construction. A pair of switches 29 and 29' are spaced from each other, and these switches are adjustably mounted on the bar 28 through the medium of set screws 30.

There is further provided a solenoid 31 which has an arm 32 that is actuated thereby, and a link 33 is pivotally connected to the outer end of the arm 32 through the medium of a pin 34, Figures 1 and 2. A lever 35 is pivotally connected to the link 33, and the lever 35 is connected to a dog or pawl 36 which includes a transverse portion 37. The transverse portion 37 of the pawl 36 is arranged in engagement with a sector plate 38, and the plate 38 includes an arcuate portion 39 and a pair of spaced apart notches or cutouts 40 and 41. The plate 38 may be pivotally connected to a suitable supporting structure through the medium of a pin 42. A link 43 has one end pivotally connected to the plate 38 through the medium of a pin 44, and a pin 45 pivotally connects the link 43 to the outer end of the arm 23 which actuates the four way valve 17.

Each of the switches 29 and 29' has the same construction and one of these switches is shown in detail in Figure 4. Thus, each switch includes a base 46 which is mounted on the bar 28, and a casing 47 extends outwardly from the base 46. A shaft 48 is reciprocably or slidably mounted in the casing 47, and a contact 49 is pivotally connected to the base 46 through the medium of a pin 50, the contact 49 including a depending tongue or lug 51. The lugs 51 are adapted to be engaged by a finger 53 which extends upwardly from a stop member 52 that is mounted on the outer end of the rod 15. The contact 49 is engaged by a head 54 on the end of the shaft 48, and a coil spring 55 is circumposed on the shaft 48 and abuts a collar 56 on the shaft 48. The shaft 48 is provided with an annular groove or cutout 57 into which projects a depending tongue or lug 58, and the lug 58 is operatively connected to or depends from a pivotally mounted lever 59. A contact member 60 is carried by the lever 59, and the contact member 60 is mounted for movement into and out of engagement with a contact member 61, Figures 4 and 5.

The electrical circuit for the assembly is shown in Figure 2 wherein the numerals 62 and 63 designate wires or conductors which lead from the switches 29 and 29'. A suitable source of electrical energy 64 is provided, and this may be the tractor battery. A manually operable switch 65 is connected in the circuit, and a stop switch 66 includes a push button 69 that is adapted to be engaged by the offset portion 68 of a lug or finger 67 which extends outwardly from the plate 38, Figures 2 and 6. Wires or conductors 70 and 71 lead from the solenoid 31 to the switch 66 and battery 64.

From the foregoing it is apparent that there has been provided a mechanism for controlling and extending the stroke of a hydraulic cylinder such as the cylinder 10. In use, the bracket 16 can be attached to a vehicle or implement being towed behind a conventional tractor, and the valve 17 can be connected to a suitable hydraulic fluid reservoir and pump by means of the conduits. By means of the present invention, the stroke or amount of movement of the rod 15 can be extended beyond the normal range so as to permit the implement or vehicle being towed to be operated with greater flexibility.

The oil pump and control valve 17 may be mounted on the tractor, and the cylinder 10 can be mounted on the machine being adjusted. Thus, the present invention permits the rod 15 to travel a greater length. The lever or handle 72 is secured to the plate 38 and this operates the four way hydraulic valve 17 through the arms 32 and 23. When the handle 72 is pushed to the left, the pawl 36 drops in the notch 41 at the right of the plate 38 so that oil will flow to the cylinder 10 until the stop member 52 on the rod 15 reaches the switch 29 or 29' to thereby close the circuit to the solenoid 31 which actuates the pawl 36 and permits the handle 72 to return to the neutral position shown in Figure 2 to thereby stop the rod 15. When the handle 72 is moved or pushed in the opposite direction, the oil will flow in the opposite direction and the rod 15 will return until the switch 29 or 29' is contacted by the stop 52. The switch 65 is normally open and when this switch is closed, it neutralizes the stroke control mechanism by lifting the pawl 36 when it is desired to extend the stroke beyond the switch 29 or 29'. The switch 66 is normally closed but is opened by the cam or offset portion 68 and the purpose of the switch 66 is to stop the flow of electricity to the solenoid 31 when the valve 17 is in its neutral position. When the lug 51 is pivoted to either of the broken line positions of Figure 4 from the solid line position, the shaft 48 will be moved to the left to thereby force the contact 60 into engagement with the contact 61 to thereby complete the circuit and the spring 55 returns the parts to their normal position.

Another advantage of the present invention is that if the stroke extended beyond the stop or switches, the piston 14 will halt at the proper position on the return stroke. By loosening the thumb screws 30, the switches 29 and 29' can be adjusted on the bar 28. Thus, the stroke can be adjusted at either end.

The present invention is especially suitable when plowing or doing other farm work in the field. Thus, ordinarily the machine depth or height is set for average conditions but when the ground is softer or harder than usual, or when grain is being harvested which is taller or shorter than the average, the present invention permits the machine to be adjusted to meet the varying conditions, since over travel is permissible. The switch 29 or 29' is a self-centering switch. The D-shaped hub on the contact 49 has the lug 51 secured thereto and the spring 55 forces the shaft 48 to a position so that the head 54 engages the contact 49. Thus, the switch is always in the position shown in Figure 4 unless it is forcibly moved. When the lug 51 is moved the contact 49 will cause the switch to be closed. Then, when the four way valve 17 is opened in the proper direction, the rod 15 will move until the stop 52 strikes the lug 51 to thereby close the circuit and trip the lever on the four way valve 17 to thereby stop the stroke of the piston. Then, if the operator wishes to go beyond the setting, it is only necessary to open the four way valve 17 in the proper direction and the stop 52 will pass beneath the lug 51 and travel until the switch near the operating handle is closed. Or, if the handle 72 has not been opened sufficiently to permit the pawl 36 to fall in the notch in the plate 38, then the handle 72 can simply be released. When the operator wishes to return the stroke to the predetermined setting, it is only necessary to open the four way valve 17 all the way in the proper direction and the stop 52 will return to the lug 51 on the switch to thereby close the switch and trip the operating lever and stop the stroke.

The valve members 25 and 26 cover the ports which lead to the conduits 20 and 21 so that the valve will hold the cylinder in position when the valve is in neutral. There is further provided an opening 73 whereby when the valve is in neutral position, oil will be able to flow directly from the conduit 22 to the conduit 19. The view shown in Figure 6 has been taken on line 6—6 of Figure 1. In Figure 1 there is shown a side elevational view of the hydraulic cylinder with the control mechanism, and with the wiring illustrated schematically.

In operation, it will be seen that if the lever 72 is forced to the left, the pawl 37 will drop in the notch 41 on the segment 38 to thereby hold the segment 38 to the left. This will force the stem 24 in the four-way valve 18 to the right, due to the provision of the link 43 and this will let the hydraulic fluid flow from the condit 22 into the conduit 21 to thereby force the piston 14 to the left. Similarly, when the lever 72 is forced to the right, the pawl 37 will drop in the notch 40 in the segment 38 to thereby hold the segment 38 to the right and through the provision of the line 43 this will force the stem 24 in the four-way valve to the left. This permits the hydraulic fluid from the conduit 22 to flow in the conduit 20 whereby the piston 14 is forced to the right.

In Figure 4 there is illustrated the switches 29 and 29' in detail. The lug 51 is fastened to the D-shaped hub 49 which rotates on the pin 50. When the lug 51 is forced either to the right or to the left, the D-shaped portion of the hub 49 will force the head 54 on the shaft 48 to the left to thereby force the tongue 58 out of the groove 57 and thus close the contacts 61 and 60. The spring 55 forces the head 54 against the flat portion of the member 49 to thereby tend to force the lug 51 in the position shown in the drawing.

The switch 66 is normally closed and is opened by the cam 68 in Figure 1 when the lever 72 is in neutral position. The purpose of the switch 66 is to stop the flow of electricity to the system when the valve 18 is in a neutral position to thereby stop the drain on the electrical system.

The switch 65 is normally opened and when closed, neutralizes the stroke control mechanism.

When the lever 72 is pushed to the left far enough, the pawl 37 will hold the four-way valve 18 open and the hydraulic fluid will force the piston 14 to the left until the stop 52 on the piston shaft forces the lug 51 of the switch 29 far enough to close the switch. When the switch is closed the solenoid will be energized to thereby raise the pawl 37 through the link 33 and arm 32 and this lets the four-way valve 18 return to neutral and thereby stop the stroke of the piston. Then, if the operator desires to go beyond the setting, he opens the four-way valve in the proper direction and the stop 52 of the cylinder shaft 15 will pass beneath the lug 51 and travel until the switch 65 is closed. Or, if the operator has not opened the valve far enough for the pawl 37 to fall in the notch 41, it is only necessary to let go of the lever. When the operator wishes to return the stroke to the predetermined setting, he merely opens the four-way valve all the way in the proper direction and the stop will return to the lug 51 to thereby stop the stroke. This series of events can happen on either end of the stroke. The valve members 25 and 26 have their lower surface widened so that the port 73 will be closed when the stem 24 is moved in either direction.

I claim:

1. In a control mechanism, a cylinder, a piston reciprocably arranged in said cylinder, a rod secured to said piston and projecting out of said cylinder, a four way valve spaced from said cylinder, conduits connecting said cylinder to said valve, clamps connected to said cylinder, a cylindrical bar arranged above said cylinder and secured to said clamps, a stop member mounted on said rod and including an upstanding finger, a pair of spaced apart switches mounted on said bar and adapted to be engaged by said stop member, a solenoid electrically connected to said switches and adapted to be connected to a source of electrical energy, a movable arm actuated by said solenoid, a pivotally mounted sector plate arranged contiguous to said arm and including a curved portion provided with a pair of spaced apart notches, a pawl engaging said sector plate, link means connecting said pawl to said arm, linkage connecting said sector plate to said four way valve, a handle for manually moving said sector plate, a lug extending from said plate and provided with an offset portion, a switch actuated by said offset portion, each of said first named switches comprises a base mounted on said bar, a set screw extending through said base and into engagement with said bar, a casing extending outwardly from said base, a shaft reciprocably mounted in said casing, a contact pivotally connected to said base and including a depending lug for engagement by the finger of said stop member, a head on the end of said shaft, for engagement with said contact, a collar mounted on said shaft, a coil spring circumposed on said shaft and abutting said collar, there being an annular groove in said shaft, a lever including a depending tongue engaging said groove, and contact members actuated by said lever.

2. In a control mechanism, a cylinder, a piston reciprocably arranged in said cylinder, a rod secured to said piston and projecting out of said cylinder, a four way valve spaced from said cylinder, conduits connecting said cylinder to said valve, clamps connected to said cylinder, a bar arranged above said cylinder and secured to said clamps, a stop member mounted on said rod and including a finger, a pair of switches mounted on said bar and adapted to be engaged by said stop member, a solenoid electrically connected to said switches and adapted to be connected to a source of electrical energy, a movable arm actuated by said solenoid, a pivotally mounted sector plate including a portion provided with a pair of spaced apart notches, a pawl engaging said sector plate, link means connecting said pawl to said arm, linkage connecting said sector plate to said four way valve, a handle for manually moving said sector plate, a lug extending from said plate and provided with an offset portion, a switch actuated by said offset portion, each of said first named switches comprises a base mounted on said bar, a securing element extending through said base and into engagement with said bar, a casing extending from said base, a shaft reciprocably mounted in said casing, a contact pivotally connected to said base and including a lug for engagement by the finger of said stop member, a head on said shaft for engagement with said contact, a collar mounted on said shaft, resilient means circumposed on said shaft and abutting said collar, there being a groove in said shaft, a lever including a tongue engaging said groove, and contact members actuated by said lever.

References Cited in the file of this patent

UNITED STATES PATENTS

| | | |
|---|---|---|
| 2,184,793 | Clench | Dec. 26, 1939 |
| 2,331,108 | Ganahl | Oct. 5, 1943 |
| 2,615,430 | Fletcher et al. | Oct. 28, 1952 |